(12) United States Patent
Khan et al.

(10) Patent No.: US 12,151,972 B1
(45) Date of Patent: Nov. 26, 2024

(54) ULTRA-HIGH-PERFORMANCE CONCRETE

(71) Applicant: KING SAUD UNIVERSITY, Riyadh (SA)

(72) Inventors: Mohammad Iqbal Khan, Riyadh (SA); Galal Mohamed Fares, Riyadh (SA); Yassir Mohammed Abbas, Riyadh (SA)

(73) Assignee: KING SAUD UNIVERSITY, Riyadh (SA)

( * ) Notice: Subject to any disclaimer, the term of this patent is extended or adjusted under 35 U.S.C. 154(b) by 0 days.

(21) Appl. No.: 18/765,547

(22) Filed: Jul. 8, 2024

(51) Int. Cl.
| | | |
|---|---|---|
| C04B 14/48 | (2006.01) | |
| C04B 14/06 | (2006.01) | |
| C04B 18/14 | (2006.01) | |
| C04B 24/26 | (2006.01) | |
| C04B 28/04 | (2006.01) | |
| C04B 103/32 | (2006.01) | |

(52) U.S. Cl.
CPC ............ C04B 14/48 (2013.01); C04B 14/068 (2013.01); C04B 18/141 (2013.01); C04B 18/146 (2013.01); C04B 24/2647 (2013.01); C04B 28/04 (2013.01); *C04B 2103/32* (2013.01); *C04B 2201/52* (2013.01)

(58) Field of Classification Search
CPC ..... C04B 14/48; C04B 14/068; C04B 18/141; C04B 18/146; C04B 24/2647; C04B 28/04; C04B 2103/32; C04B 2201/52
USPC .......................................................... 524/5
See application file for complete search history.

(56) References Cited

U.S. PATENT DOCUMENTS

| | | | |
|---|---|---|---|
| 12,098,098 B1 * | 9/2024 | Alharbi | ............... C04B 24/2647 |
| 2018/0222798 A1 | 8/2018 | Ibrahim et al. | |
| 2021/0214277 A1 * | 7/2021 | Olivier | .................... C04B 28/34 |

FOREIGN PATENT DOCUMENTS

| | | |
|---|---|---|
| CN | 107963855 A | 4/2018 |
| CN | 110526640 A | 12/2019 |
| CN | 111423180 A | 7/2020 |
| CN | 114804758 A | 7/2022 |
| EP | 4223721 A1 | 8/2023 |

OTHER PUBLICATIONS

Zhang, et al., "Performance of mortar and concrete made with a fine aggregate of desert sand," Building and Environment, vol. 41, Issue 11, Nov. 2006, pp. 1478-1481.
Qu, et al., "Preparation and acceleration mechanism of a ternary hardening accelerator for high-performance concrete with full aeolian sand"; Construction and Building Materials, vol. 369, Mar. 10, 2023, 130629.
Zhang, et al., "Investigation of steel fiber reinforced high-performance concrete with full aeolian sand: Mix design, characteristics and microstructure"; Construction and Building Materials vol. 342, Part B, Aug. 1, 2022, 128065.
Meng, "Design and performance of cost-effective ultra-high performance concrete for prefabricated elements"; (2017). Doctoral Dissertations. 2582. https://scholarsmine.mst.edu/doctoral_dissertations/2582 no DESERT sand or "ternary microsteel fibers.."
Reddy, et al., "Experimental studies on mechanical properties and impact characteristics of ternary concrete with steel fiber"; Materials Today: Proceedings, vol. 27, Part 2, 2020, pp. 788-797.
Jialing, et al., "Mechanical Properties of Desert-Sand-Based Steel-PVA Hybrid Fiber Reinforced Engineered Cementitious Composites (H-DSECC)"; Sep. 2022 KSCE Journal of Civil Engineering 26(7) DOI:10.1007/s12205-022-1746-1 (abstract).
Abed, et al., "Influence of ternary hybrid fibers on the mechanical properties of ultrahigh-strength concrete"; Front. Mater., Feb. 23, 2023 Sec. Structural Materials vol. 10-2023 | https://doi.org/10.3389/fmats.2023.1148589.
Yu, et al., "Influence of eco-friendly fine aggregate on macroscopic properties, microstructure and durability of ultra-high performance concrete: A review"; Dec. 2022 Journal of Building Engineering 65(9):105783 DOI:10.1016/j.jobe.2022.105783; (Abstract).
Hou, et al., "The Effect of Polypropylene Fiber and Glass Fiber on the Frost Resistance of Desert Sand Concrete"; Nov. 2023 KSCE Journal of Civil Engineering 28(1):1-12, DOI:10.1007/s12205-023-0694-8 (Abstract).
"Fibres for concrete—CCA"; website article from ccaa.com.au, accessed on Apr. 23, 2024.

* cited by examiner

*Primary Examiner* — Hannah J Pak
(74) *Attorney, Agent, or Firm* — Nath, Goldberg & Meyer; Joshua B. Goldberg

(57) ABSTRACT

An ultra-high performance concrete (UHPC) including empty quarter desert sand (EQS) and micro-steel fibers (HyTUHPC). The ultra-high performance concrete (UHPC) can have a high viscosity due to the presence of EQS.

19 Claims, 4 Drawing Sheets

ULTRA-HIGH-PERFORMANCE CONCRETE

BACKGROUND

1. Field

The disclosure of the present patent application relates to an ultra-high-performance concrete (UHPC) composition, and particularly, to a concrete composition that includes empty quarter desert sand (EQS) and hybrid ternary micro-steel fibers (HyTUHPC).

2. Description of the Related Art

Conventional concrete is composed of cement, coarse aggregates, fine aggregates and water, as well as other additives. Conventional concrete features many disadvantageous properties and contributes to environmental problems.

Polymer-based materials may provide an alternative to existing concrete binders and structural stabilizers. However, many polymers are easily degradable and polymer-based materials often feature low tensile strength, low toughness, and other physical properties that lead to material deterioration, fracture, cracking and failure.

Empty quarter desert sand (EQS) extends across about 650,000 km$^2$ of Arabian Gulf countries, which also occupies about the third of the Arabian Peninsula. As such, EQS is an ideal resource for various applications.

Thus, an ultra-high performance concrete (UHPC) solving the aforementioned problems are desired.

SUMMARY

The present subject matter relates to ultra-high performance concrete (UHPC) including empty quarter desert sand (EQS) and hybrid ternary micro-steel fibers (HyTUHPC). The ultra-high performance concrete (UHPC) can have a high viscosity due to the presence of EQS. Accordingly, the ultra-high performance concrete can tolerate an extremely high content of the micro-steel microfibers which minimizes brittleness of the UHPC.

According to an embodiment, the ultra-high performance concrete can include from about 16 wt % to about 22 wt % EQS; from about 65 wt % to about 78 wt % Portland cement, sulfate resisting cement, pozzolana cement or white cement; from about 16 wt % to about 22 wt % silica fume; from about 4 wt % to about 8 wt % fly ash; from about 1.5 wt % to about 2.5 wt % polycarboxylate ether-based superplasticizer; from about 8.5 wt % to about 11 wt % water; and from about 4 wt % to about 12 wt % micro-steel fibers. In an embodiment, the total cementitious material can be as high as 1450 kg/m3. In an embodiment, the EQS can be ground EQS. In an embodiment, the EQS can have different particle size distributions. In an embodiment, the ultra-high performance concrete can include ground, granulated blast furnace slag (GGBFS). In an embodiment, the ultra-high performance concrete can include about 16 wt % to about 22 wt % EQS and GGBFS combined.

According to an embodiment, the ultra-high performance concrete (UHPC) can include empty quarter desert sand (EQS) and hybrid ternary micro-steel fibers (HyTUHPC), wherein the micro-steel fibers comprise three different types of micro-steel fibers, a first type of micro-steel fiber having a length of about 13 mm, a second type of micro-steel fibers having a length ranging from about 18 mm to about 20 mm, and a third type of micro-steel fibers having a length of about 30 mm.

These and other features of the present subject matter will become readily apparent upon further review of the following specification.

DETAILED DESCRIPTION OF THE PREFERRED EMBODIMENTS

Figure 1:
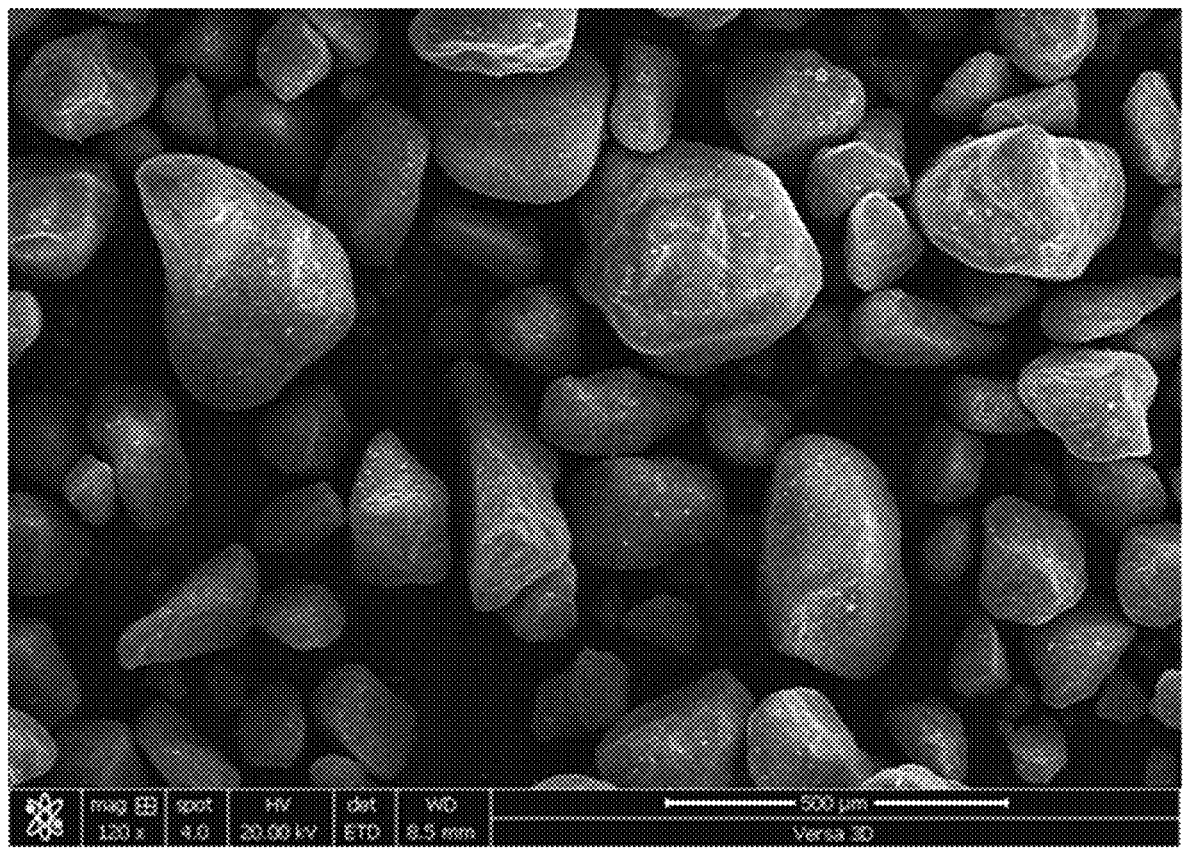
FIG. 1 is a scanning electron micrograph (SEM) of EQS grains.

The following definitions are provided for the purpose of understanding the present subject matter and for construing the appended patent claims.

Definitions

Throughout the application, where compositions are described as having, including, or comprising specific components, or where processes are described as having, including, or comprising specific process steps, it is contemplated that compositions of the present teachings can also consist essentially of, or consist of, the recited components, and that the processes of the present teachings can also consist essentially of, or consist of, the recited process steps.

It is noted that, as used in this specification and the appended claims, the singular forms "a", "an", and "the" include plural references unless the context clearly dictates otherwise.

In the application, where an element or component is said to be included in and/or selected from a list of recited elements or components, it should be understood that the element or component can be any one of the recited elements or components, or the element or component can be selected from a group consisting of two or more of the recited elements or components. Further, it should be understood that elements and/or features of a composition or a method described herein can be combined in a variety of ways without departing from the spirit and scope of the present teachings, whether explicit or implicit herein.

The use of the terms "include," "includes", "including," "have," "has," or "having" should be generally understood as open-ended and non-limiting unless specifically stated otherwise.

The use of the singular herein includes the plural (and vice versa) unless specifically stated otherwise. In addition, where the use of the term "about" is before a quantitative value, the present teachings also include the specific quantitative value itself, unless specifically stated otherwise. As used herein, the term "about" refers to a ±10% variation from the nominal value unless otherwise indicated or inferred.

The term "optional" or "optionally" means that the subsequently described event or circumstance may or may not occur, and that the description includes instances where said event or circumstance occurs and instances in which it does not.

It will be understood by those skilled in the art with respect to any chemical group containing one or more substituents that such groups are not intended to introduce any substitution or substitution patterns that are sterically impractical and/or physically non-feasible.

Unless defined otherwise, all technical and scientific terms used herein have the same meaning as commonly understood to one of ordinary skill in the art to which the presently described subject matter pertains.

Where a range of values is provided, for example, concentration ranges, percentage ranges, or ratio ranges, it is understood that each intervening value, to the tenth of the unit of the lower limit, unless the context clearly dictates otherwise, between the upper and lower limit of that range and any other stated or intervening value in that stated range, is encompassed within the described subject matter. The upper and lower limits of these smaller ranges may independently be included in the smaller ranges, and such embodiments are also encompassed within the described subject matter, subject to any specifically excluded limit in the stated range. Where the stated range includes one or both of the limits, ranges excluding either or both of those included limits are also included in the described subject matter.

Throughout the application, descriptions of various embodiments use "comprising" language. However, it will be understood by one of skill in the art, that in some specific instances, an embodiment can alternatively be described using the language "consisting essentially of" or "consisting of".

For purposes of better understanding the present teachings and in no way limiting the scope of the teachings, unless otherwise indicated, all numbers expressing quantities, percentages or proportions, and other numerical values used in the specification and claims, are to be understood as being modified in all instances by the term "about". Accordingly, unless indicated to the contrary, the numerical parameters set forth in the following specification and attached claims are approximations that may vary depending upon the desired properties sought to be obtained. At the very least, each numerical parameter should at least be construed in light of the number of reported significant digits and by applying ordinary rounding techniques.

The present subject matter relates to ultra-high performance concrete including empty quarter desert sand (EQS) and hybrid ternary micro-steel fibers (HyTUHPC). The ultra-high performance concrete can have a high viscosity due to the presence of EQS. Accordingly, the ultra-high performance concrete can tolerate an extremely high content of the micro-steel microfibers which minimizes brittleness in the UHPC and renders the UHPC less susceptible to material deterioration, fracture, cracking, and failure than conventional concrete.

In an embodiment, the EQS can be procured from Al-Kharkhir, the Eastern borders of the Najran province in Saudi Arabia. The EQS can be the main aggregate in the UHPC. The EQS can have a very unique particle size distribution due to the effect of wind prevalent in the regions from which it is obtained. Additionally, a particle size of the EQS can be generally spherical due to the circulation patterns of the wind prevalent in those areas.

In an embodiment, the median grain size of the EQS can be about 320 μm or less. In an embodiment, the median grain size of the EQS can range from about 100 μm to about 320 μm.

In one embodiment, the ultra-high performance concrete can include from about 16 wt % to about 22 wt % EQS; from about 65 wt % to about 78 wt % Portland cement; from about 16 wt % to about 22 wt % silica fume; from about 4 wt % to about 8 wt % fly ash; from about 1.5 wt % to about 2.5 wt % polycarboxylate ether-based superplasticizer; from about 8.5 wt % to about 11 wt % water; from about 4 wt % to about 12 wt % Hybrid ternary microsteel fibers. In an embodiment, the total cementitious material can be as high as 1450 kg/m3. In an embodiment, the EQS can be ground EQS. In an embodiment, the EQS can have different particle size distributions. In an embodiment, the ultra-high performance concrete can include ground, granulated blast furnace slag (GGBFS). In an embodiment, the ultra-high performance concrete can include about 16 wt % to about 22 wt % of EQS and GGBFS combined.

In one embodiment, the ultra-high performance concrete can include one or more types of micro-steel fibers. In one embodiment, the ultra-high performance concrete can include three different types of micro-steel fibers," (referred to as "hybrid ternary micro-steel fibers," herein) integrated into the EQS. According to an embodiment, the micro-steel fibers can have an aspect ratio ranging from about 50 to about 100. According to an embodiment, the micro-steel fibers can have a length ranging from about 10 μm to about 30 μm. According to an embodiment, the micro-steel fibers can have a diameter ranging from about 190 μm to about 360 μm. According to an embodiment, the micro-steel fibers can have a density of about 7.85 (g/cm$^3$).

In an embodiment, the ultra-high performance concrete can include up to about 8% hybrid ternary micro-steel fibers (of the total weight of the whole mix). In an embodiment, of the total weight of the ternary micro-steel fibers, about 70% to about 75% of the micro-steel fibers have a length of about 13 mm, while about 20% to about 22% of the micro-steel fibers have a length ranging from about 18 mm to about 20 mm and about 3% to about 5% of the micro-steel fibers have a length of about 30 mm.

In an embodiment, the ultra-high performance concrete can include at least one of regular dune sands and white sands.

The following examples illustrate the present teachings.

EXAMPLES

Example 1

EOS Analysis

Figure 2:
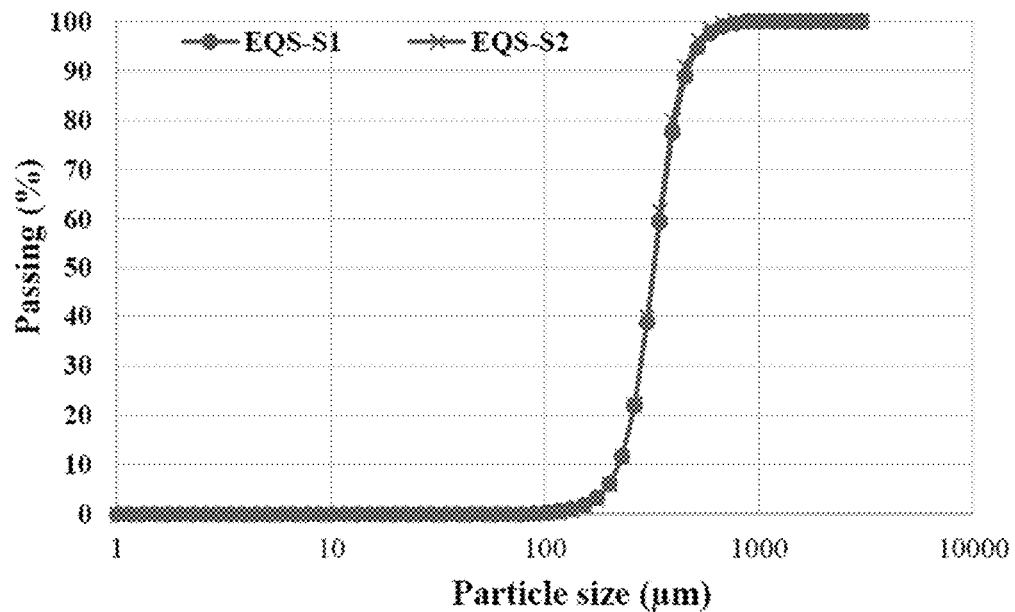
FIG. 2 is a graph showing the particle size distribution of the EQS grains.

EQS was procured from Al-Kharkhir, along the Eastern border of the Najran region of Saudi Arabia. After procurement of the EQS, samples were tested for particle size distribution. The EQS grains were analyzed using a scanning electron microscope (SEM), as shown in FIG. 1. The particle size distribution was assessed using a laser particle size analyzer, as shown in FIG. 2. The particle size distribution parameters, as shown in FIG. 2 indicate that the average median size of the grains was about 320 μm.

TABLE 1

| Particle size distribution parameters for EQS | | | |
|---|---|---|---|
| Particle parameters (μm) | EQS (S1) | EQS (S2) | Average (μm) |
| D10 | 220 | 221 | 220.5 |
| D50 (median size) | 323 | 320 | 321.5 |
| D90 | 460 | 446 | 453 |

Example 2

Steel Microfibers

Four micro-steel fibers were obtained with different physical properties, as shown in Table 2, below.

TABLE 2

| Physical properties of micro-steel fibers | | | | | |
|---|---|---|---|---|---|
| Size Group (S) | | T1 | T2 | T3 | T4 |
| Aspect Ratio | Provided | 65 | 100 | 60 | 100 |
| | Measured | 67 | 95.7 | 52.9 | 83.3 |
| Length (μm) | | 13 | 20 | 18 | 30 |
| Diameter (μm) | Provided | 200 | 200 | 300 | 300 |
| | Measured | 193 | 209 | 340 | 360 |
| Density (g/cm$^3$) | 7.85 | 7.85 | 7.85 | 7.85 | 7.85 |

Example 3

Preparation of Concrete

Dry components of the concrete mix were pre-mixed first and then combined with water and a superplasticizer for a period of time ranging from about 15 minutes to about 30 minutes until a highly flowable mix was obtained. Then, each of the micro-steel fiber types were added one at a time (e.g., T1, T3, and T4, or T1, T2, and T4). After the addition of T4, the mixing was stopped. After 1 minute, casting was performed. A mixture of three different micro-steel fibers (a ternary combination) was prepared. Type I (T1) was the major component in the ternary mix with a percentage of up to about 80% of the total mass while Type 4 (T4) had the lowest content of about 10% of the total combination mass. Either T2 or T3 can be used with used with T1 and T4 in the ternary combination with a percentage of up to about 20% of the total mass.

TABLE 3

| Mix composition of ternary micro-steel fibers | |
|---|---|
| | Ter-Steel (kg/m$^3$) |
| Cement | 1124.13 |
| SF | 239.19 |
| FA | 66.11 |
| Steel fiber T1 | 152.10 |
| Steel Fiber T3 | 25.35 |
| Steel Fiber T4 | 18.15 |
| EQS | 642.65 |
| W | 212.93 |
| PCE9 | 39.80 |

Figure 3:
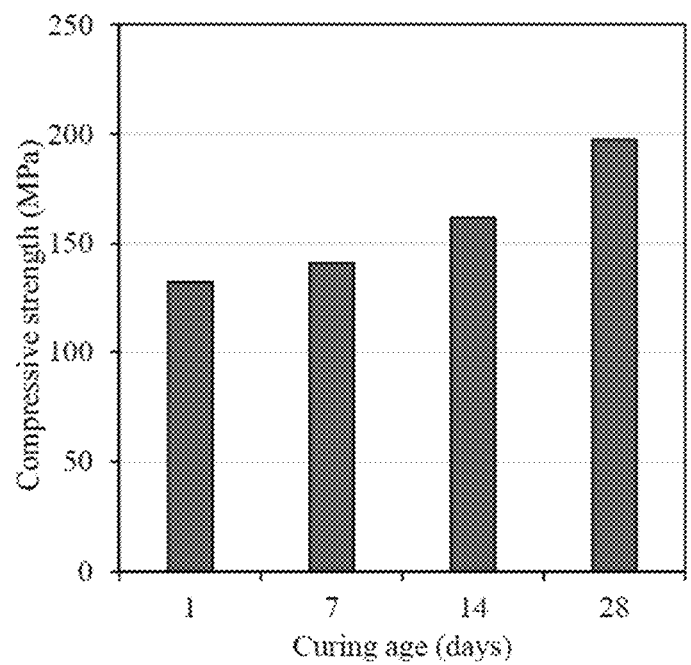
FIG. 3 is a graph showing compressive strength over curing time for 28 days.
Figure 4:
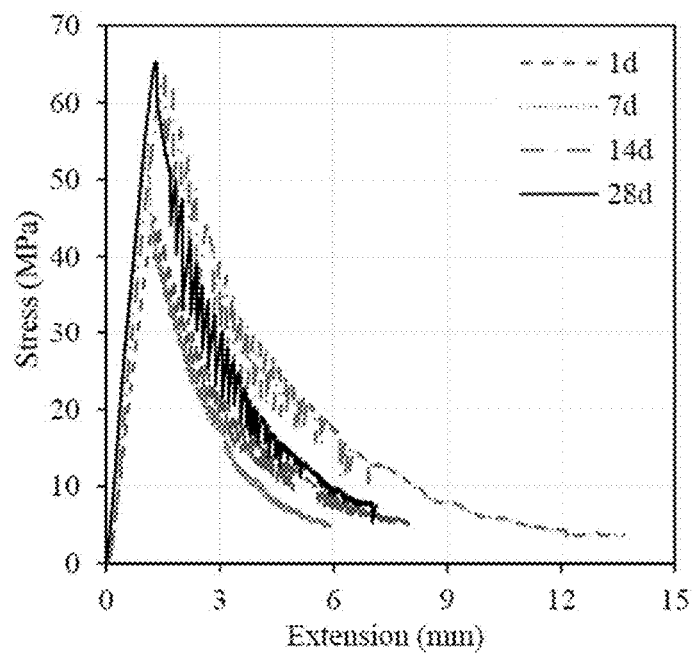
FIG. 4 is a graph showing flexure stress-extension curves of the tested prism samples of the ternary micro-steel fibers mix at 1, 7, 14, and 28 days.
Figure 5:
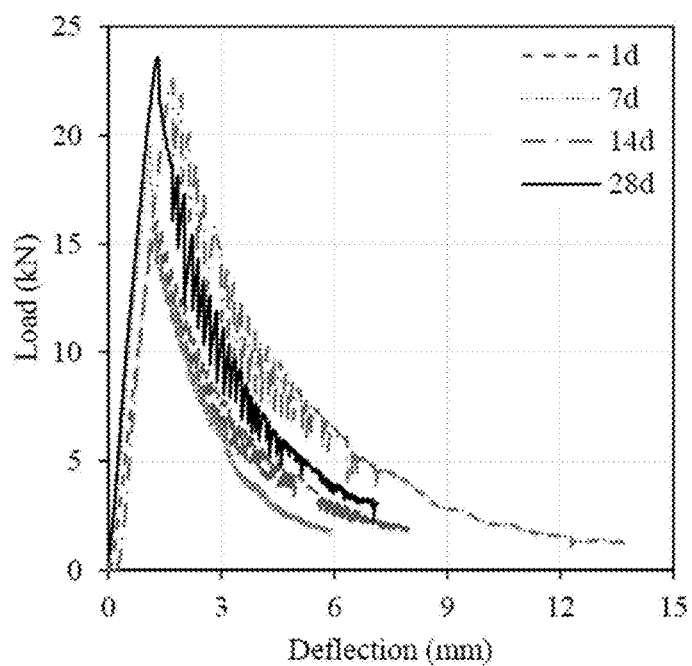
FIG. 5 is a graph showing load-deflection curves of the tested prism samples of the hybrid ternary micro-steel fibers mix at 1, 7, 14, and 28 days.
Figure 6:
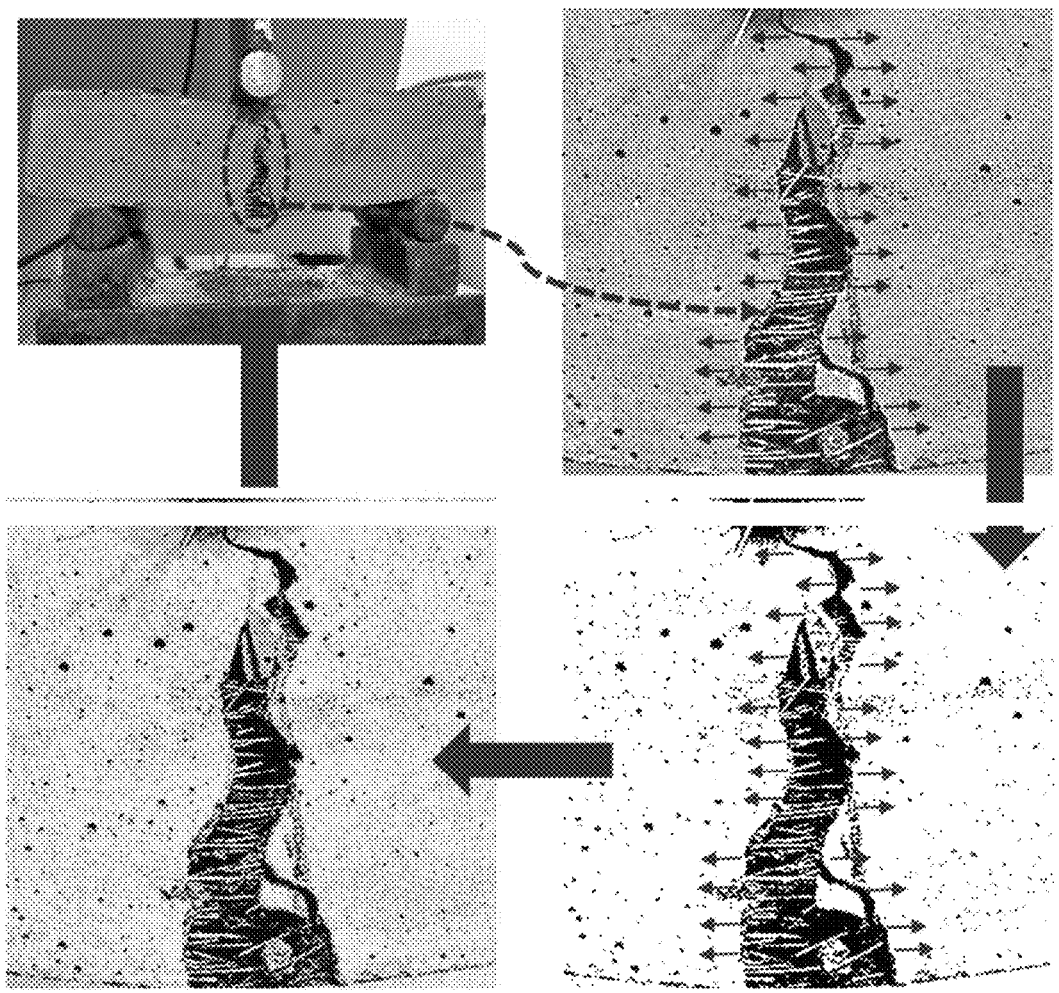
FIG. 6 is an image analysis of the tested prism confirming enhanced micro-steel fibers dispersion.

The prepared samples after demolding were cured underwater for 28 days to test for compressive, flexural strengths and load-deflection curves. The results are shown in FIGS. 3, 4, and 5, respectively. The fibers distribution is verified after testing. It is confirmed that fiber is highly dispersed in the axial direction that supports the flexural strengths, as demonstrated in FIG. 6.

It is to be understood that the ultra-high performance concrete is not limited to the specific embodiments described above, but encompasses any and all embodiments within the scope of the generic language of the following claims enabled by the embodiments described herein, or otherwise shown in the drawings or described above in terms sufficient to enable one of ordinary skill in the art to make and use the claimed subject matter.

We claim:

1. An ultra-high performance concrete (UHPC), comprising empty quarter desert sand (EQS) and hybrid ternary micro-steel fibers (HyTUHPC).

2. The ultra-high performance concrete (UHPC) of claim 1, wherein the ultra-high performance concrete (UHPC) comprises from about 16 wt % to about 22 wt % empty quarter desert sand (EQS) and from about 4 wt % to about 12 wt % micro-steel fibers.

3. The ultra-high performance concrete (UHPC) of claim 1, further comprising from about 65 wt % to about 78 wt % Portland cement or white cement; from about 16 wt % to about 22 wt % silica fume; from about 4 wt % to about 8 wt % fly ash; from about 1.5 wt % to about 2.5 wt % polycarboxylate ether-based superplasticizer; and from about 8.5 wt % to about 11 wt % water.

4. The ultra-high performance concrete (UHPC) of claim 1, further comprising ground, granulated blast furnace slag (GGBFS).

5. The ultra-high performance concrete (UHPC) of claim 4, wherein an amount of EQS in the ultra-high performance concrete is about 16 wt % to about 22 wt % and wherein the EQS is partly replaced by GGBFS.

6. The ultra-high performance concrete (UHPC) of claim 1, wherein a median grain size of the EQS ranges from about 100 μm to about 320 μm.

7. The ultra-high performance concrete (UHPC) of claim 1, wherein a median grain size of the EQS is about 320 μm.

8. The ultra-high performance concrete (UHPC) of claim 1, wherein the micro-steel fibers comprise three different types of micro-steel fibers, a first type of micro-steel fiber having a length of about 13 mm, a second type of micro-steel fibers having a length ranging from about 18 mm to about 20 mm, and a third type of micro-steel fibers having a length of about 30 mm.

9. The ultra-high performance concrete (UHPC) of claim 8, wherein the ultra-high performance concrete (UHPC) comprises from about 70% to about 75% of the first type of micro-steel fibers, from about 20% to about 22% of the second type of micro-steel fibers, and from about 3% to about 5% of the third type of micro-steel fibers.

10. An ultra-high performance concrete, comprising from about 16 wt % to about 22 wt % EQS; from about 65 wt % to about 78 wt % Portland cement or white cement; from about 16 wt % to about 22 wt % silica fume; from about 4 wt % to about 8 wt % fly ash; from about 1.5 wt % to about 2.5 wt % polycarboxylate ether-based superplasticizer; from about 8.5 wt % to about 11 wt % water; and from about 4 wt % to about 12 wt % micro-steel fibers.

11. The ultra-high performance concrete (UHPC) of claim 10, further comprising ground, granulated blast furnace slag (GGBFS).

12. The ultra-high performance concrete (UHPC) of claim 11, wherein an amount of EQS in the ultra-high performance concrete is about 16 wt % to about 22 wt % and wherein the EQS is partly replaced by GGBFS.

13. The ultra-high performance concrete (UHPC) of claim 10, wherein a median grain size of the EQS ranges from about 100 µm to about 320 µm.

14. The ultra-high performance concrete (UHPC) of claim 10, wherein a median grain size of the EQS is about 320 µm.

15. The ultra-high performance concrete (UHPC) of claim 10, wherein the micro-steel fibers comprise three different types of micro-steel fibers, a first type of micro-steel fiber having a length of about 13 mm, a second type of micro-steel fibers having a length ranging from about 18 mm to about 20 mm, and a third type of micro-steel fibers having a length of about 30 mm.

16. The ultra-high performance concrete (UHPC) of claim 15, wherein the ultra-high performance concrete (UHPC) comprises from about 70% to about 75% of the first type of micro-steel fibers, from about 20% to about 22% of the second type of micro-steel fibers, and from about 3% to about 5% of the third type of micro-steel fibers.

17. An ultra-high performance concrete, comprising empty quarter desert sand (EQS) and micro-steel fibers, the micro-steel fibers comprising three different types of micro-steel fibers, a first type of micro-steel fiber having a length of about 13 mm, a second type of micro-steel fibers having a length ranging from about 18 mm to about 20 mm, and a third type of micro-steel fibers having a length of about 30 mm.

18. The ultra-high performance concrete of claim 17, wherein the ultra-high performance concrete (UHPC) comprises from about 70% to about 75% of the first type of micro-steel fibers, from about 20% to about 22% of the second type of micro-steel fibers, and from about 3% to about 5% of the third type of micro-steel fibers.

19. The ultra-high performance concrete of claim 18, wherein a median grain size of the EQS ranges from about 100 µm to about 320 µm.

* * * * *